United States Patent [19]
Kall

[11] 3,977,977
[45] Aug. 31, 1976

[54] SEPARATING DEVICE
[75] Inventor: Horst Kall, Gummersbach, Germany
[73] Assignee: L. & C. Steinmuller GmbH, Germany
[22] Filed: Feb. 6, 1975
[21] Appl. No.: 547,491

Related U.S. Application Data
[63] Continuation-in-part of Ser. No. 408,067, Oct. 19, 1973, abandoned.

[30] Foreign Application Priority Data
Oct. 19, 1972   Germany............................ 2251173

[52] U.S. Cl.................................... 210/521; 55/440
[51] Int. Cl.².................... B01D 43/00; B01D 45/04
[58] Field of Search...................... 55/440, 442–446, 55/183, 257; 210/521, 522

[56] References Cited
UNITED STATES PATENTS
| 1,956,591 | 5/1934 | Gies | 55/440 X |
| 2,643,736 | 6/1953 | Smith | 55/440 |
| 3,849,095 | 11/1974 | Regehr | 55/440 X |

FOREIGN PATENTS OR APPLICATIONS
| 828,547 | 12/1969 | Canada | 55/440 |

Primary Examiner—Frank W. Lutter
Assistant Examiner—Kathleen J. Prunner
Attorney, Agent, or Firm—McGlew and Tuttle

[57] ABSTRACT

A device for separating heavier particles from fluid including liquids or solids from a gaseous fluid or solids from a liquid fluid includes a housing having an inlet and outlet spaced from one another so as to define a passage therebetween and a plurality of undulated deflecting elements in horizontally spaced vertical relationship within the passage parallel to the flow direction. Each deflecting element includes a plurality of cavities defining individual gullies for separating heavier particles from the fluid located at spaced locations along the lengths thereof. The gullies include at least a first gully which is advantageously arranged at some of the vertices of the undulated deflecting elements and these comprise a rear wall which forms a part of the undulating element and which has an exterior side forming a valley on the side opposite the gully, a downstream wall which extends outwardly of the rear wall and curves in an upstream direction to define an apex on its exterior and a curved wall on its interior, and an upstream wall which extends in a downstream direction outwardly from the rear wall at a location upstream of the downstream wall, the downstream wall overlapping a portion of the upstream wall which is spaced inwardly thereof to define a first gully entrance. Fluid which is deflected over the undulating areas of the separating elements is directed through the entrance of the first gully and it whirls in a whirling flow causing the separation of the small particles which fall downwardly by gravity in the gully without being able to flow out of it. The construction includes a second gully located at another apex preferably downstream of the first gully and which has a larger entrance defined by spaced apart upstream and downstream walls which define a cavity substantially parallel to the flow direction.

5 Claims, 3 Drawing Figures

SEPARATING DEVICE

REFERENCE TO ANOTHER APPLICATION

This application is a continuation-in-part of application Ser. No. 408,067 filed Oct. 19, 1973 and now abandoned.

BACKGROUND OF THE INVENTION

1. Field of the Invention

This invention relates, in general, to the construction of separating devices and, in particular, to a new and useful device for separating heavier particles from fluids including liquids or solids from gaseous mediums or solids from a liquid medium by the use of a flow path defined by a plurality of horizontally spaced separating elements which include undulated side walls having gully formations at their apices with at least one gully being formed with overlapping boundary walls with a small entrance opening defining a whirling first gully chamber which separates some of the smaller particles and with at least one second gully having a wider opening and being defined by boundary walls which are spaced apart in parallel so that the gully extends in a direction parallel to the flow direction.

2. Description of the Prior Art

Fluid separators are known which include separating wall portions defining flow channels which include separating gullies formed in the walls of the type to permit a whirling separation of the heavier particles from the remaining fluid flow. The known constructions are insufficient, however, because they do not have a combination of gully formations, one of a type to entrain smaller particles and another of a type to entrain those larger particles which have not been entrained by the first gully.

SUMMARY OF THE INVENTION

In accordance with the present invention, there is provided a fluid separator construction wherein the walls separating the fluid flow into horizontal flow paths are provided with undulations with gullies arranged at at least some of the apices of the undulations and which include at least one first gully which has boundary walls which overlap permitting entrance and whirling flow of the fluid flow and separation of the particles and also which include a second gully having an entrance opening parallel to the flow which entrains large particles by direct flow therein.

The invention provides a construction wherein the separated liquid or solid which enters into the first gully is no longer able to move back into the mainstream and it becomes separated by the action of gravity by moving downwardly in the gully in which it is trapped.

The present invention operates primarily on inertia forces wherein the particles are trapped within a gully by the force of the flow in the whirling action which is produced by the gully formation. This is in contradistinction to devices which have been known which operate by electrostatic or similar methods of separation. The separation by inertia is characterized in the present instance by the fact that once the fluid portions enter into the gully the separated liquid or solid cannot enter the main flow stream anymore, not even in the presence of great quantities of separated matter or of high flow velocities.

In accordance with another feature of the invention, the individual gully elements are defined particularly in the deflection zone so that they cause as little pressure loss in the stream as possible. The invention makes this possible by providing a combination of two differently designed first and second gully pockets or chambers which are disposed in series in the flow direction in order to obtain an optimal separation degree. The first gully is defined so that the upstream wall lapses below the downstream wall causing inflow of the fluid into the gully in a whirling action. The construction prevents the outflowing of the entrained heavier particles. In the second gully construction, there is no overlap of the walls, but the slot is relatively wide and arranged directly in the fluid flow path.

In accordance with a further aspect of the invention, the two differently-shaped first and second gullies are advantageously arranged at the apices of an undulated wall area. The second gully with the wider entrance opening is advantageously arranged downstream of the first gully. The plurality of the first type of gullies may advantageously be followed by a plurality of the second type.

In accordance with a preferred construction, the first gully is formed by a downstream wall in respect to the flow direction which curves inwardly toward the upstream wall and the upstream wall opens in a direction away from the downstream wall at the entrance. The construction facilitates the inflow of the fluid into the gully and the whirling motion thereof along the curved entrance portion of the rear wall. The vortex of the whirling flow may be controlled within the gully so that the water escaping therefrom from the centrifuge below the rear lip portion of the rear wall at the entrance to the trap pocket. With such a construction, the liquid or solid particles which have once entered the trap pocket can no longer escape, not even if the device is operated at a very high flow velocity.

Experience has shown that sometimes the entrance openings of the first gullies become clogged due to the small size of the openings by oversize water drops which do not drain downwardly. In such a case, a subsequent drop can easily glide over this closed part of the inlet slot and pass to the rear and be partly dragged out of the separator. In order to be able to trap and drain these liquid drops after the liquid passes the first gully, the invention provides second gullies disposed downstream in which the entrance slot is wider and the flow is in a direction parallel to the flow direction. Any water droplets which tend to become trapped in the entrance of the second gully can easily flow downwardly under the effect of gravity before they have grown to the width of the whole entrance opening.

The construction of the two gullies in combination provide an optimization of the fluid separation.

Accordingly, it is an object of the invention to provide an improved fluid flow separating device which includes undulating separating walls arranged in spaced location to define a plurality of horizontal flow paths therebetween and which include at least one first gully construction which has a relatively small first gully entrance defined by spaced-apart overlapped upstream and downstream gully walls and which also includes a second gully formed downstream of the first gully having a larger entrance than the first gully and opening in a direction parallel to the flow direction.

A further object of the invention is to provide a fluid flow device which includes an undulating deflecting element having a gully formation at one of its apices which includes a downstream wall forming the apex with a portion that extends upstream in the flow direction to overlap an upstream gully wall which is spaced apart therefrom and defines a small entrance opening and wherein the downstream wall is curved to provide a whirling flow adjacent the entrance which causes a separation of the heavier particles and the trapping thereof so that they do not return to the flow stream.

A further object of the invention is to provide a flow separating device which is simple in design, rugged in construction and economical to manufacture.

For an understanding of the principles of the invention, reference is made to the following description of typical embodiments thereof as illustrated in the accompanying drawings.

GENERAL DESCRIPTION OF THE PREFERRED EMBODIMENTS

Figure 1:
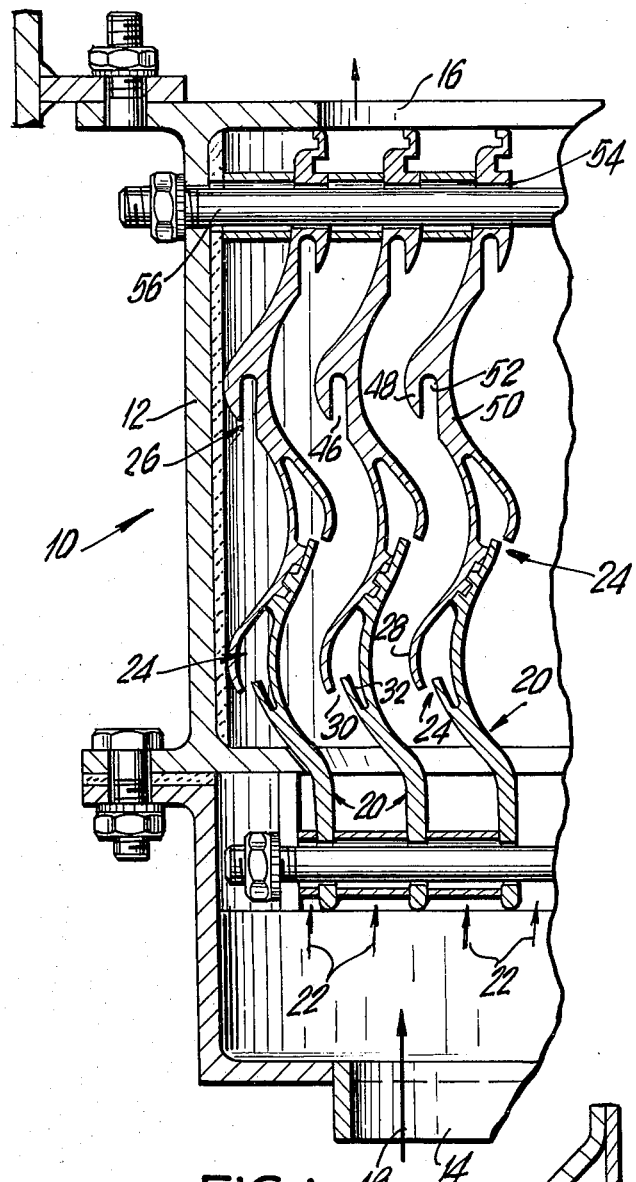
FIG. 1 is a horizontal sectional view of a fluid separating device constructed in accordance with the invention.

Referring to the drawings, in particular, the invention embodied therein comprises a device for separating heavier constituents or particles from fluids including liquids or solids from gaseous medium or solids from a liquid medium and which is generally designated 10. The separator 10 includes a housing 12 having an entrance opening 14 at one end thereof and a discharge opening 16 at the opposite end. Fluid flows in through inlet 14 in the direction of the arrow 18 indicated. The main flow 18 separates and flows between a plurality of separating partitions or deflecting elements generally designated 20 as indicated by the small flow direction arrows 22.

In accordance with the invention, each deflecting element 20 is advantageously formed in an undulating or waveshaped form and its apices are provided with first gullies or separating cavities generally designated 24 followed downstream by second gullies or separating chambers generally designated 26.

In accordance with a feature of the invention, each first gully 24 is formed as a cavity $a$ located at an apex of the undulated separating element 20 which includes a plurality of waves and valleys between the waves. Each cavity $a$ is defined by a gully rear wall $b$ which forms part of the undulating element and which has an exterior side forming a valley on the opposite side of the element. In addition, an outer downstream wall 28 extends outwardly from the rear wall $b$ and curves in an upstream direction to define an apex $c$ on its exterior and a curved stream deflecting wall $d$ on its interior. The construction includes an upstream wall 32 which extends outwardly from the rear gully wall $b$ at a location upstream from the wall 28, and it is formed with the curvature of the element 20 outwardly toward the apex $c$. The downstream wall 28 has a portion overlapping a portion of the upstream wall 32 and it is spaced from the upstream wall to define a first gully entrance 30 therebetween.

A feature of the construction is that the downstream wall 28 extends outwardly into the fluid flow so as to entrain the fluid flow which flows thereby and to direct it into the gully entrance 30. The interior curved portion $d$ deflects the flow into a circular path and imparts a whirling flow to the fluid as it moves into the gully $a$. The whirling flow causes the centrifugal separation of the heavy particles in the fluid flow.

Figure 3:
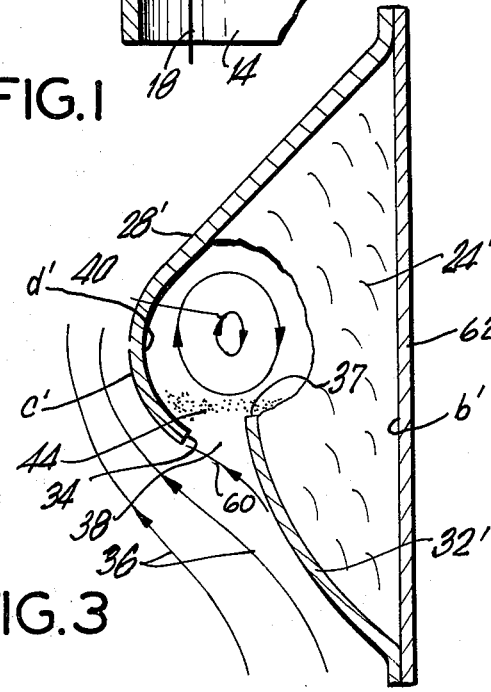
FIG. 3 is a schematic representation of a slightly different embodiment of the first gully wall formation upon the deflecting elements which are employed in the device of FIG. 1.

An alternate embodiment of the first gully is shown in FIG. 3 wherein parts are similarly designated, but with primes. In this embodiment, the upstream wall 32' extends outwardly and downstream from the rear gully wall $b'$, but is curved inwardly and slightly at its downstream end so as to terminate in an end 37 which is turned inwardly in respect to an end 34 of a downstream wall 28' which has a complete curved formation to form an apex $c'$. In FIG. 3, it is indicated how the fluid stream flows around the wave-shaped formation, as indicated by the arrows 36. A portion of the stream which is set to flow inwardly of the arrow 60, as shown in FIG. 3, will be directed around in a circular path by the deflecting wall $d'$ which is formed at the interior of the downstream wall 28'. The stream which enters through the gully entrance 38 defined between the ends 34 and 37 whirls into a vortex as indicated by the arrows 40 and the heavier particles 44 become separated in the area indicated between the ends 34 and 37. The type of vortex 40 which is formed depends on the curvature of the deflecting wall $b'$ and also by the inward curvature of the upstream wall 32'. The substances 44, which are removed from the gully, move by the action of gravity in a direction normal to the flow direction, but downwardly.

In accordance with a feature of the invention, any materials which are not separated by the action of the first gullies 24 are acted upon by the second gullies 26. A feature of the second gullies is that they have an entrance opening 46 which is larger than the opening 30 of the first gully and the boundary walls are such that the flow is directly into the gully entrance 46 in a direction parallel to the flow direction. For this purpose, an outer or rearward wall 48 has an interior surface which extends parallel to the flow direction and is spaced outwardly from an inner wall 50 having a similar interior wall which is parallel to the flow direction so that the complete cavity 52 extends inwardly parallel to the flow direction.

Figure 2:
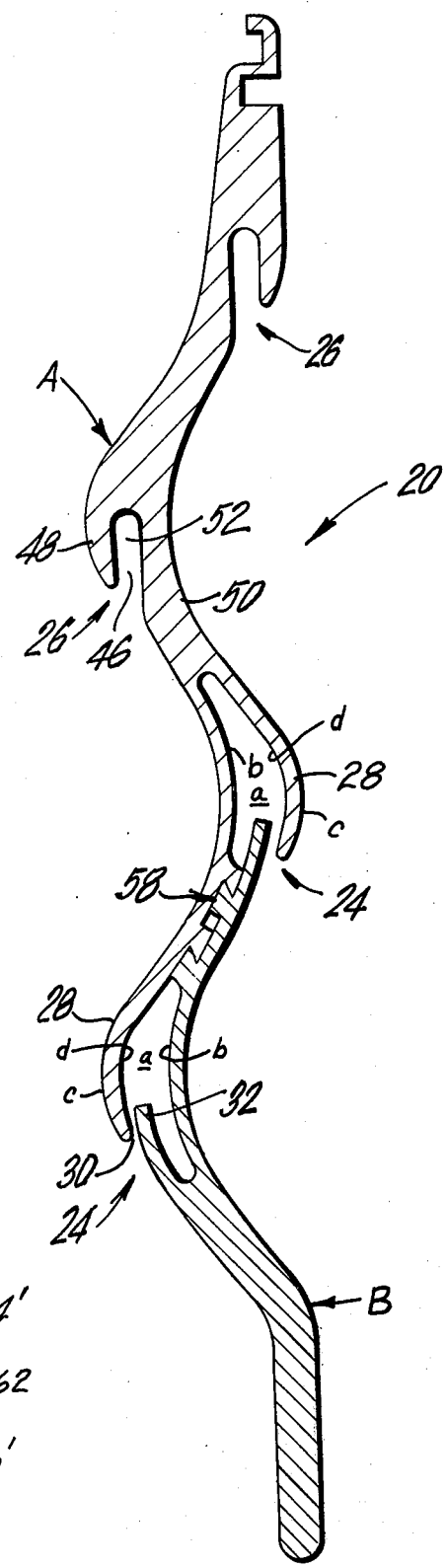
FIG. 2 is an enlarged sectional view of one of the deflecting elements shown in FIG. 1.

As shown in FIG. 2, the deflecting elements generally designated 20, are made up of two interconnected parts generally designated A and B. The assembly of parts A and B in the embodiment shown in FIG. 2 include one first gully 24 and one second gully 26 on each side. As shown best in FIG. 1, the deflecting elements 20 are advantageously provided with slots or openings 54 to facilitate the positioning of the elements over bolts 56. The part A is connected to the part B by means of interfitting dovetail portions 58. Both sides of the deflecting element are advantageously undulated, as shown in the embodiment of FIG. 2, but for some installations, one side may require a flat or non-waveshaped opposite wall 62 as shown in FIG. 3.

As shown in FIG. 2, deflecting elements generally designated 20 are advantageously made up of a plurality of interconnectable parts or portions generally designated 50 and 53 each of which may include one or more first gullies 24 by one or more second gullies 26. The deflecting elements 24 are advantageously provided with slots or openings 54 for positioning over holding bolts 56 as shown in FIG. 1. Part 50 is connected to the part 53 by means of interfitting dovetailed portions 58. Both sides of the deflecting element are advantageously undulated and both sides are advantageously provided with first and second gullies 24 and 26.

While specific embodiments of the invention have been shown and described in detail to illustrate the application of the principles of the invention, it will be understood that the invention may be embodied otherwise without departing from such principles.

I claim:

1. A device for separating heavier substances from fluids including liquids or solids from gaseous medium or solids from a liquid medium and wherein the medium is arranged to flow in a flow direction, comprising a housing having an inlet, an outlet spaced from said inlet with a passage between said inlet and said outlet for flow in a flow direction from said inlet through said passage to said outlet, a plurality of horizontally spaced vertically arranged undulated deflecting elements positioned in side-by-side relationship in said flow passage parallel to the flow direction, said deflecting elements each having a plurality of alternating waves and valleys with each wave having an apex and including a plurality of separation chambers defining individual gullies for separating heavier substances from the fluid spaced along the length of each of said deflecting elements on at least one side thereof and including at least one first gully arranged at an apex of one of said waves of said undulated deflecting elements, said gully being defined by a rear gully wall formed by a wall portion of said deflecting element, a downstream wall curved outwardly in an upstream direction from said rear gully wall to form an apex on its exterior and a curved deflection wall on its interior and an upstream wall having the curvature of said deflecting elements extending in a downstream direction outwardly from said rear wall at a location upstream of said downstream wall toward said downstream wall and inwardly of the downstream wall, said downstream wall having a portion overlapping a portion of said upstream wall and being spaced from said upstream wall to define the first gully entrance therebetween, said downstream wall projecting outwardly into the fluid flow and entraining the fluid to flow through said gully entrance so that said deflection wall on its interior deflects the flow into a circular path and imparts a whirling flow to the fluid as it moves into said gully, the whirling flow causing centrifugal separation of the heavier particles in the fluid flow, said deflecting elements including at least one second gully at another apex of said deflecting elements downstream from said first gully and having spaced-apart upstream and downstream parallel boundary walls defining an entrance therebetween larger than said first gully entrance and defining a second gully therebetween extending parallel to the flow direction so as to entrain larger size particles therein which are not entrained by said first gully, said boundary wall interior bordering said second gully being parallel to the flow direction.

2. A device according to claim 1, wherein said upstream wall has a downstream end portion which bends inwardly to the interior of the gully, said downstream wall being curved in the formation of an apex of the wave portion terminating in an edge spaced from the edge of said upstream wall.

3. A device according to claim 1, wherein said upstream wall terminates in an end extending into said gully, said downstream wall continuing beyond the end of said upstream wall in overlapping relationship with said upstream wall and defining a flow passage therebetween into said gully.

4. A device according to claim 1, wherein said deflecting elements are made up of a plurality of parts.

5. A device according to claim 1, wherein said deflecting elements include openings at each end, and a bolt extending through the openings of said deflecting elements at each end and holding said elements in spaced relationship in said housing.

* * * * *